(12) United States Patent
Gehring et al.

(10) Patent No.: US 7,310,424 B2
(45) Date of Patent: Dec. 18, 2007

(54) ENCRYPTION KEY DISTRIBUTION AND NETWORK REGISTRATION SYSTEM, APPARATUS AND METHOD

(75) Inventors: Stephan Walter Gehring, Menlo Park, CA (US); Daniel Paul Peters, Carlsbad, CA (US); Jason Lee Ellis, San Diego, CA (US); Satish Ananthakrishnan, San Diego, CA (US)

(73) Assignee: General Atomics, San Diego, CA (US)

( * ) Notice: Subject to any disclaimer, the term of this patent is extended or adjusted under 35 U.S.C. 154(b) by 862 days.

(21) Appl. No.: 10/032,228

(22) Filed: Dec. 21, 2001

(65) Prior Publication Data

US 2003/0048905 A1 Mar. 13, 2003

Related U.S. Application Data

(60) Provisional application No. 60/314,145, filed on Aug. 22, 2001.

(51) Int. Cl.
*H04L 9/00* (2006.01)
(52) U.S. Cl. .................................... 380/277; 380/278
(58) Field of Classification Search ................ 380/270
See application file for complete search history.

(56) References Cited

U.S. PATENT DOCUMENTS

| | | | |
|---|---|---|---|
| 6,137,885 A * | 10/2000 | Totaro et al. ............... | 380/247 |
| 6,480,957 B1 * | 11/2002 | Liao et al. .................. | 713/170 |
| 2002/0076051 A1 * | 6/2002 | Nii .............................. | 380/232 |
| 2002/0080967 A1 * | 6/2002 | Abdo et al. ................. | 380/270 |
| 2002/0141591 A1 * | 10/2002 | Hawkes et al. ............. | 380/278 |
| 2003/0086388 A1 | 5/2003 | Peters et al. | |
| 2004/0202327 A1 * | 10/2004 | Little et al. ................. | 380/270 |
| 2005/0089052 A1 * | 4/2005 | Chen et al. ................. | 370/401 |

OTHER PUBLICATIONS

A. S. Tanenbaum, "*Operating Systems: Design and Implementation*", chapter 4, pp. 216-217, Prentice Hall, 1987.
Compaq Computer Corporation, et al.; *Universal Serial Bus Specification Revision 2.0*; Apr. 27, 2000; pp. 19-20, 24, 195-208; USB Implementers Forum, Inc.
European Telecommunications Standards Institute (ETSI); *EN 300 652 V1.2.1 "Broadband Radio Access Networks (BRAN); High Performance Radio Local Area Network (HIPERLAN) Type 1; Functional Specification"*; vol. 1.2.1; Jul. 1998; pp. 15-20, 28-34, 37-40, 46-52, 63-79; ETSI.

(Continued)

*Primary Examiner*—Nasser Moazzami
*Assistant Examiner*—Pramila Parthasarathy
(74) *Attorney, Agent, or Firm*—Fitch, Even, Tabin & Flannery

(57) ABSTRACT

A control method, apparatus, and system capable of securely distributing a shared secret network encryption key from a host to a wireless peripheral device. The sharing of the secret network encryption key is accomplished without the intervention of a man-machine interface at the peripheral. Embodiments enable a wireless device to receive and store multiple encryption keys, to select the appropriate encryption key depending on the network in range of the device, and thus to freely associate with multiple networks.

71 Claims, 9 Drawing Sheets

OTHER PUBLICATIONS

European Telecommunications Standards Institute (ETSI); *ETSI Technical Report, ETR 133, "Radio Equipment and Systems (RES); High Performance Radio Local Area Network (HIPERLAN); System Definition"*; Jul. 1994; pp. 9-25; ETSI.

European Telecommunications Standards Institute (ETSI); *ETSI TS 101 761-1 V1.1.1; "Broadband Radio Access Networks (BRAN); HIPERLAN Type 2; Data Link Control (DLC) Layer Part 1: Basic Data Transport Functions"*; vol. 1.1.1; Apr. 2000; pp. 12-14, 47-62, 75-81; ETSI.

European Telecommunications Standards Institute (ETSI); *ETSI TS 101 761-2 V1.1.1; "Broadband Radio Access Networks (BRAN); HIPERLAN Type 2; Data Link Control (DLC) Layer; Part 2: Radio Link Control (RLC) sublayer"*; vol. 1.1.1; Apr. 2000; pp. 17-52; ETSI.

European Telecommunications Standards Institute (ETSI); *ETSI TS 101 761-4 V1.1.1; "Broadband Radio Access Networks (BRAN); HIPERLAN Type 2; Data Link Control (DLC) Layer; Part 4: Extension for Home Environment"*; vol. 1.1.1; Jun. 2000; pp. 13-17, 25-27, 71-80; ETSI.

G. J. Popek and C. S. Kline, *"Encryption and Secure Computer Networks"*, pp. 331-356, ACM Computing Surveys, v. 11, No. 4, 1979 as published at www.cs.wisc.edu/~sschang/OS-Oual/security/network_security.htm; pp. 1-2; University of Wisconsin, Computer Sciences.

Institute of Electrical and Electronics Engineers (IEEE); *ISO/IEC 8802-11:1999(E); ANSI/IEEE Std 802.11*; First Edition, 1999; pp. 17-33, 59-69, 98-116, 136-137; IEEE.

Telefonaktiebolaget LM Ericsson, et al.; *Specification of the Bluetooth System (Core)*; vol. 1; Version 1.0B; Nov. 29, 1991; pp. 45-46, 149-177, 193-202, 449-450, 1042-1061; Bluetooth Special Interest Group (SIG).

Telefonaktiebolaget LM Ericsson, et al.; *Specification of the Bluetooth System (Core)*; *"HCI RS232 Transport Layer"*; vol. 1; Version 1.0B; Nov. 29, 1999; pp. 778-793; Bluetooth Special Interest Group (SIG).

Telefonaktiebolaget LM Ericsson, et al.; *Specification of the Bluetooth System (Profiles)*; vol. 2; Version 1.0B; Dec. 1, 1999; pp. 22-51; Bluetooth Special Interest Group (SIG).

* cited by examiner

ENCRYPTION KEY DISTRIBUTION AND NETWORK REGISTRATION SYSTEM, APPARATUS AND METHOD

RELATED APPLICATIONS

This application claims the benefit of co-pending U.S. Provisional Application Ser. No. 60/314,145 filed Aug. 22, 2001.

BACKGROUND

1. Field of the Invention

Aspects of the present invention relate in general to the field of communications network access security.

2. Background

The broadcast nature of wireless data transmission makes transmitted information susceptible to interception by third parties. Wireless networks, just like public networks, such as the Internet, must hence be considered insecure. As information transferred wirelessly between electronic devices is often of proprietary nature, there is a need to protect this information from eavesdropping.

Conventionally, one method of securing network access is by using encryption.

In a typical system using encryption, a sender encrypts the information using an encryption engine and an encryption key. The resulting information is rendered unintelligible to any party except to the recipient in possession of the decryption key. The recipient decrypts the received information using a decryption engine and the appropriate decryption key and thus translates the encrypted information into its original readable form.

Traditionally, the same key is used for both encryption and decryption. This is called "private key" or "symmetric" cryptography. Keys that are used for both encryption and decryption are referred to as "symmetric keys." The shared key must remain secret since any party in possession of this key can decrypt information previously encrypted with the key. In order to establish a shared secret key, the key must be distributed among the communicating parties by means of a secure channel.

In public-key cryptography, the encryption key and the decryption key are distinct. The encryption key is public and can therefore be sent to the other party over an insecure communication channel. The decryption key is kept private and never revealed. To encrypt a message for a recipient, the sender uses the recipient's public encryption key. The encrypted message is then sent to the recipient over the insecure channel. The recipient uses its private decryption key to decrypt the received encrypted message.

DETAILED DESCRIPTION

The primary advantage of public-key cryptography is that the secret private key need never be revealed to any party. However, public-key methods can be significantly slower than established private-key methods, which is an important drawback for high-speed communication with devices with very limited computational capabilities such as computer peripherals. One aspect of the invention is taking advantage of the discovery that public-key methods are unsuited for broadcasting encrypted information to multiple recipients since each recipient device has its own decryption key, whereas private-key methods use a single shared decryption key.

Consequently, another aspect of the present invention is the discovery that there is therefore a need to securely distribute a shared secret encryption key among communicating parties.

Aspects of the present invention further include a system, apparatus and method to securely distribute a shared secret network encryption key from a host to a wireless peripheral device. In some aspects, the sharing of the secret network encryption key is accomplished without the intervention of a man-machine interface. Embodiments enable a wireless device to receive and store multiple encryption keys, to select the appropriate encryption key depending on the network in range of the device, and thus to freely associate with multiple networks.

It is understood that although the following embodiments are disclosed using a wireless connection to communicate between the host device and peripheral devices, other embodiments may equally apply to other forms of communicating information between devices. Other equally applicable media for communicating include, but are not limited to, wired connections, optically coupled connections, and any other connection as is known in the art.

Figure 1A:
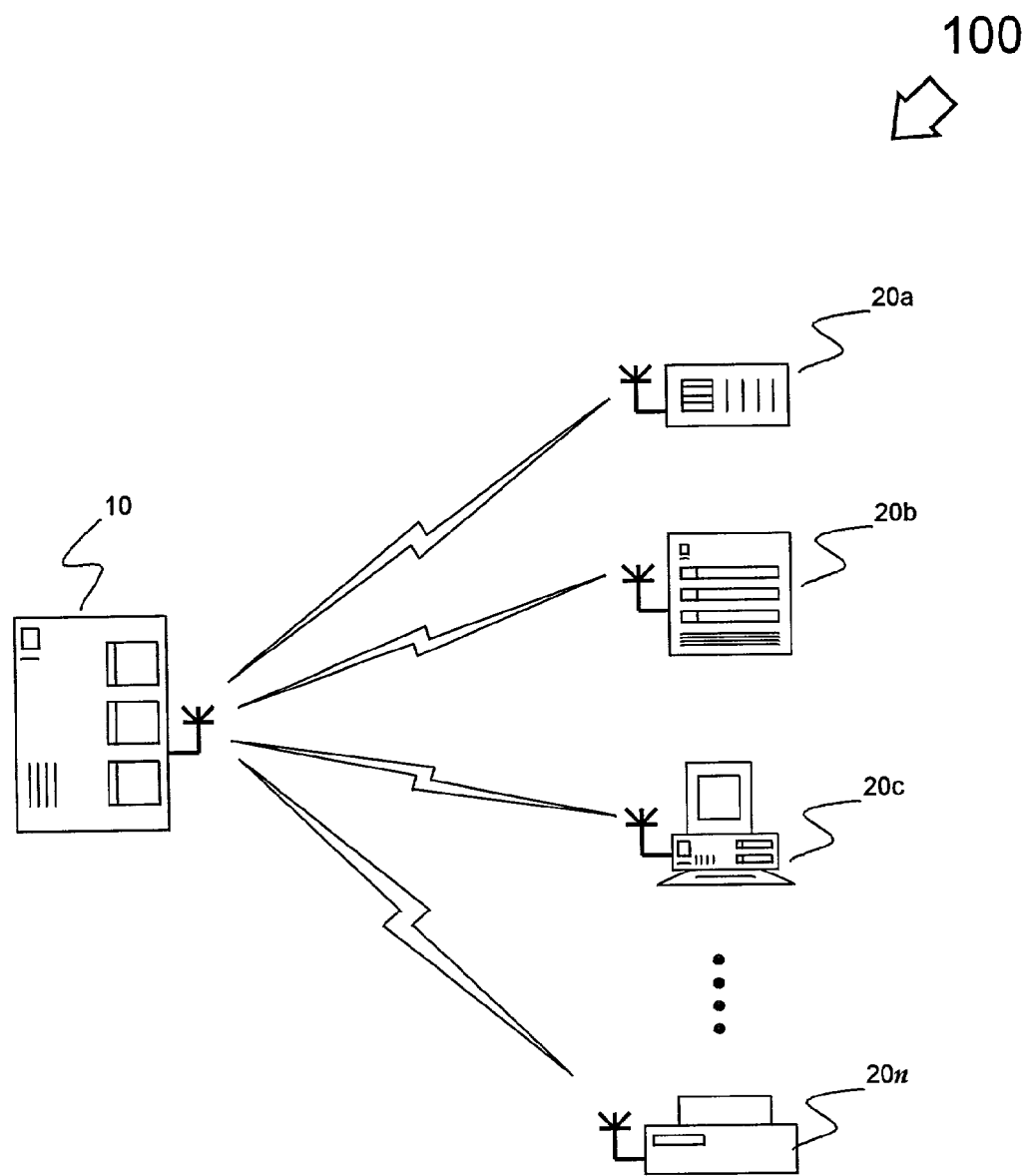
FIGS. 1A and 1B illustrate embodiments of a system to securely distribute a shared secret network encryption key from a host to a wireless peripheral device.

FIG. 1A is a simplified diagram depicting system 100, constructed and operative in accordance with an embodiment of the present invention. System 100 is configured to securely distribute a shared secret network encryption key from a wireless host device 10 to a wireless peripheral device 20.

In some embodiments, wireless peripheral devices 20 are expected to be limited in resources, lacking a man-machine interface for network-related tasks. These network-related tasks include entering peripheral device encryption keys. Also, in many embodiments, wireless peripheral devices 20 may not have a processor available to perform complex communication tasks.

It is understood that method embodiments of the present invention may securely distribute a shared secret network encryption key from a host device 10 to any number of wireless peripheral devices 20*a-n*, although some embodiments using particular data protocols may be limited in number of peripheral devices 20, by the data protocol itself Furthermore, it is understood that the embodiments described herein may communicate with any wired or wireless communications protocol and technology known in the art. Examples of wireless communication protocols and technology include, but are not limited to: wireless Universal Serial Bus (wireless USB), ultra-wide-band (UWB), wireless Institute of Electrical and Electronics Engineers (IEEE) Standard No. 1394 ('wireless Firewire'), Institute of Electrical and Electronics Engineers (IEEE) Standard Nos. 802.11a and 802.11b ("Wi-Fi"), Bluetooth, and wireless RS-232. For convenience, embodiments below will now be discussed using the Universal Serial Bus (USB) protocol.

Figure 1B:
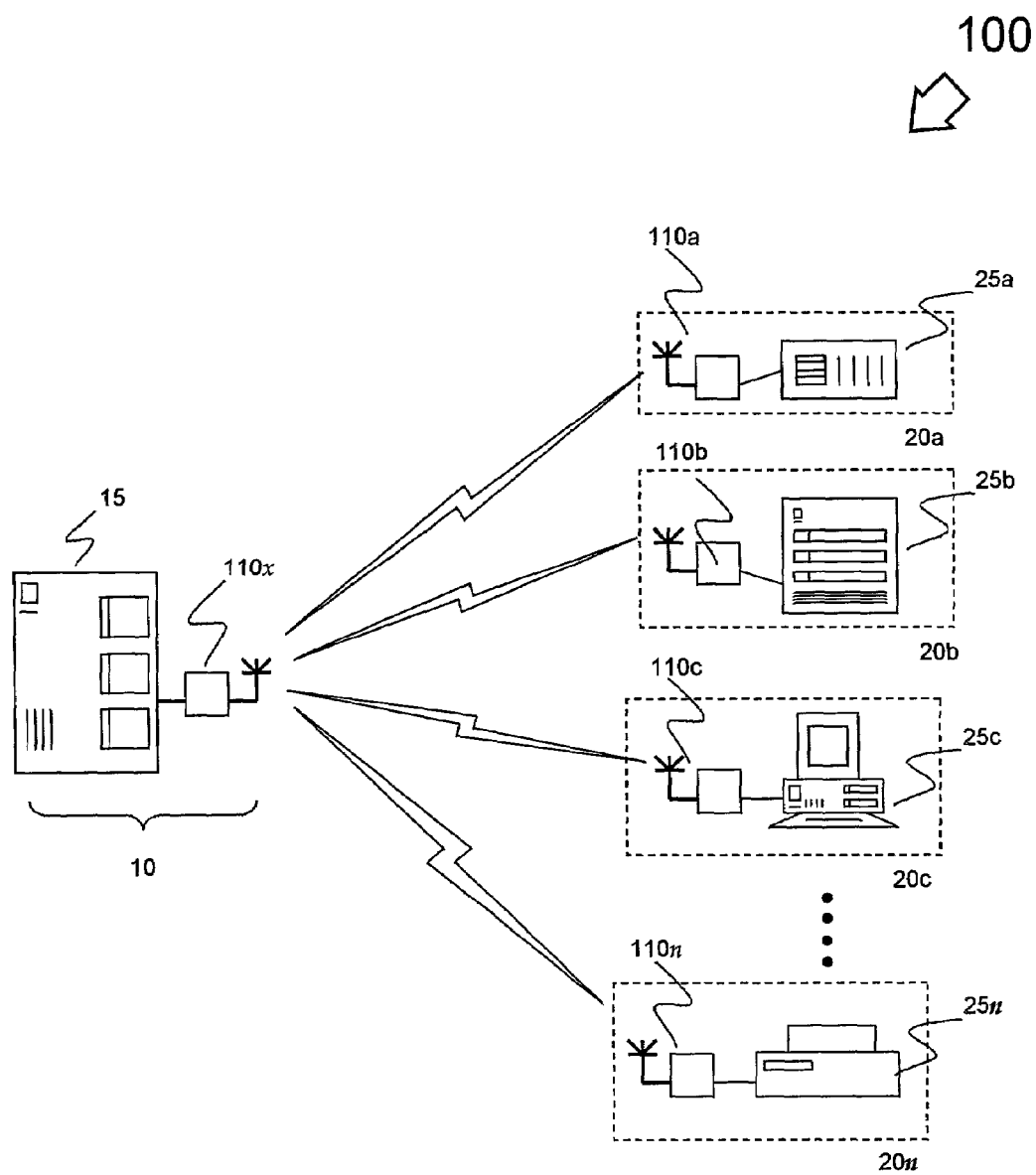

As shown in FIG. 1B, constructed and operative in accordance with an embodiment of the present invention, the wireless devices 10, 20 depicted in system 100 may comprise host 15 and peripheral devices 25 coupled to a wireless module 110 embodiment of the present invention. For example, wireless host device 10 may be further comprised of host 15 and a wireless module 110*x*.

Wireless modules 110*a-n* and 110*x* are any devices that allow a conventional computing device to communicate with other wireless modules 110 or wireless devices 10,20 using a method embodiment of the present invention, as described in the claims below. The host device 15 interacts with the wireless network through wireless module 110. The wireless module 110 sends data received from the host 15 to wireless peripheral devices 20 and passes on data received from wireless peripheral devices 20 through the network to the host 15.

Figure 2:
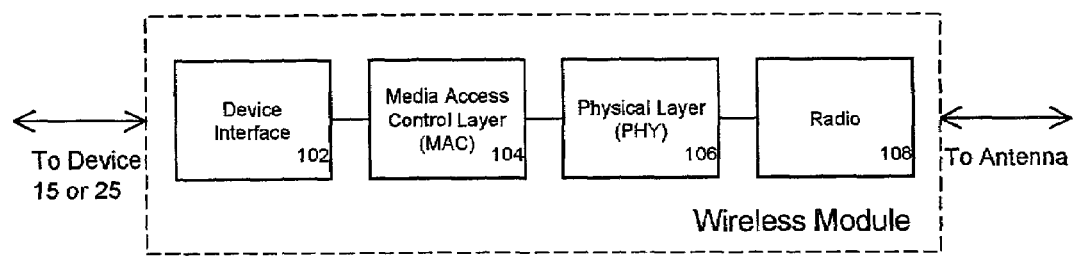
FIG. 2 is a block diagram of a wireless module to securely distribute a shared secret network encryption key from a host to a wireless peripheral device.

FIG. 2 is a block diagram of wireless module 110, constructed and o accordance with an embodiment of the present invention. It is well understood by those knowledgeable in the art that the elements of FIG. 2 may be implemented as structures in hardware, firmware, or as software instructions and data encoded on a computer-readable storage medium. Wireless module 110 comprises device interface 102, media access control layer (MAC) 104, physical layer (PHY) 106, and radio 108. In some embodiments, wireless module 110 may also include an antenna (not shown), as is known in the art.

Device interface 102 is any interface, as is known in the art, which allows wireless module 110 to interface with host 15 or peripheral device 25. In some embodiments, device interface 102 may emulate a standard communications protocol so that host 15 or peripheral device 25 does not realize that it is communicating with another wireless device. For example, in wireless USB embodiments, device interface 102 may emulate a USB interface.

Media access control layer 104 is any structure that governs access to the wireless transmission media. As shown in FIG. 2, media access control layer 104 is coupled to device interface 102 and physical layer 106, enabling device interface 102 to exchange data with the physical layer 106.

Physical layer 106 is any structure that provides the procedures involved in transferring a single bit across the wireless frequency spectrum being used by the wireless module 110.

Radio 108 may be any radio frequency (RF) transceiver known in the art to allow wireless module 110 to transmit and receive communication signals.

Figure 3:
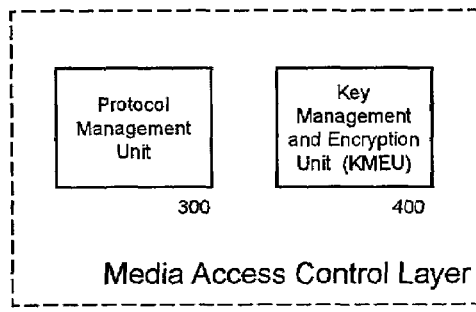
FIG. 3 is a block diagram of a media access control (MAC) layer to securely distribute a shared secret network encryption key from a host to a wireless peripheral device.

FIG. 3 is a block diagram of a media access control layer 104, constructed and operative in accordance with an embodiment of the present invention. In this embodiment, media access control layer 104 comprises a protocol management unit 300 and a key management and encryption unit (KMEU) 400.

Protocol management unit 300 is the structure that enables media access control layer 104 to communicate using a particular wireless communications protocol, as described above. For example, in a wireless Universal Serial Bus embodiment, protocol management unit 300 (wireless USB) processes messages from device interface 102 and regulates the message access to the physical layer 106 using the Universal Serial Bus protocol. In embodiments using different wireless protocols, a corresponding protocol may be implemented in protocol management unit 300.

Encryption and decryption of messages may be performed by key management and encryption unit 400. As shown in FIG. 3, KMEU 400 may be situated in the MAC layer 104. In some embodiments, however, media access control layer 104 may only comprise protocol management unit 300. In such embodiments, the key management and encryption unit 400 may be located in, or functionally distributed within the wireless module 110, among other parts of the path between devices 15 or 25 and the antenna. Therefore, the location of the key management and encryption unit 400 should not be viewed as limiting the scope of the embodiments of the present invention, which are limited solely by the claims.

Figure 4A:
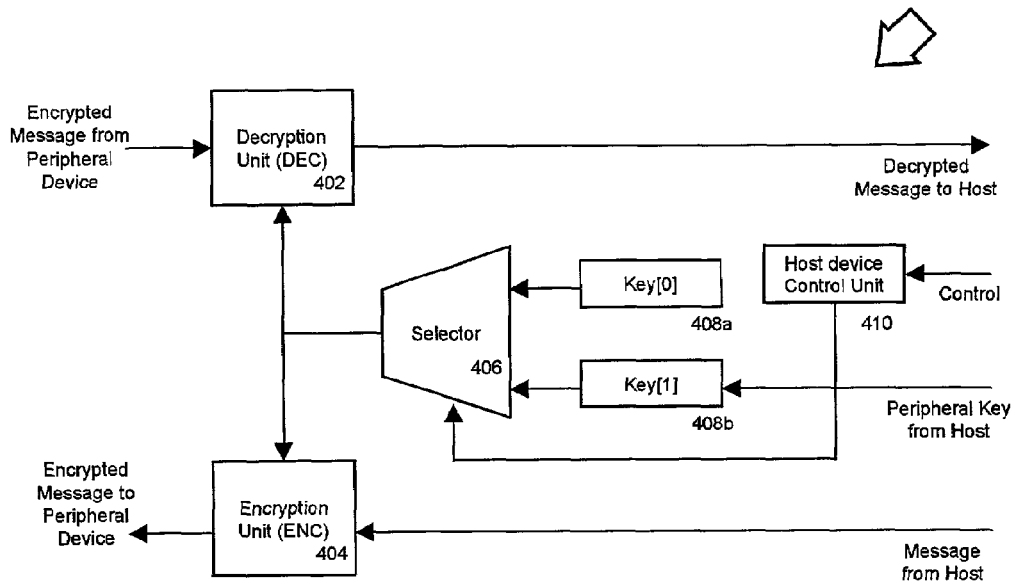
FIGS. 4A-4C are block diagrams of alternate embodiments of a key management and encryption unit (KMEU) to securely distribute a shared secret network encryption key from a host to a wireless peripheral device.
Figure 4B:
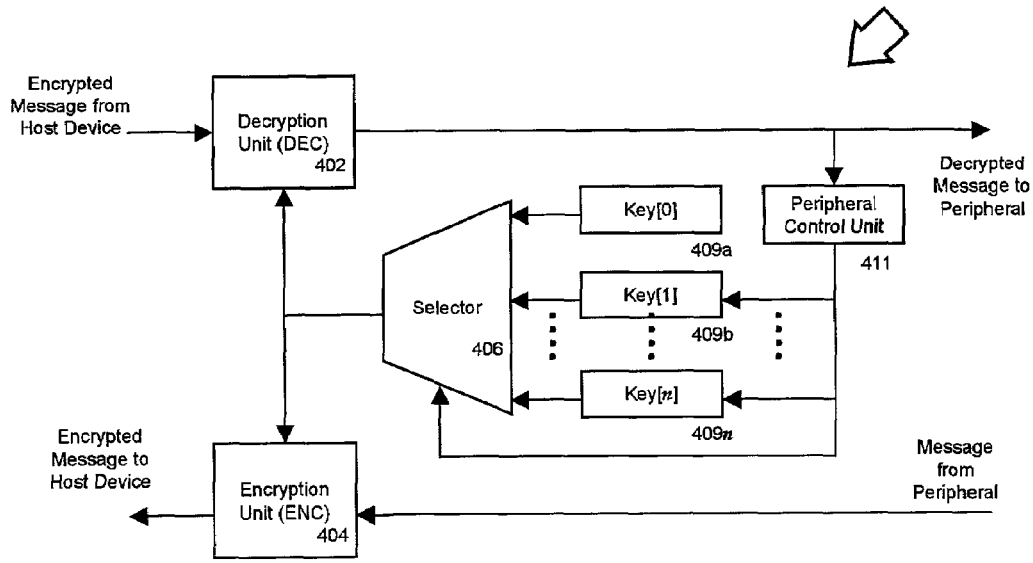
Figure 4C:
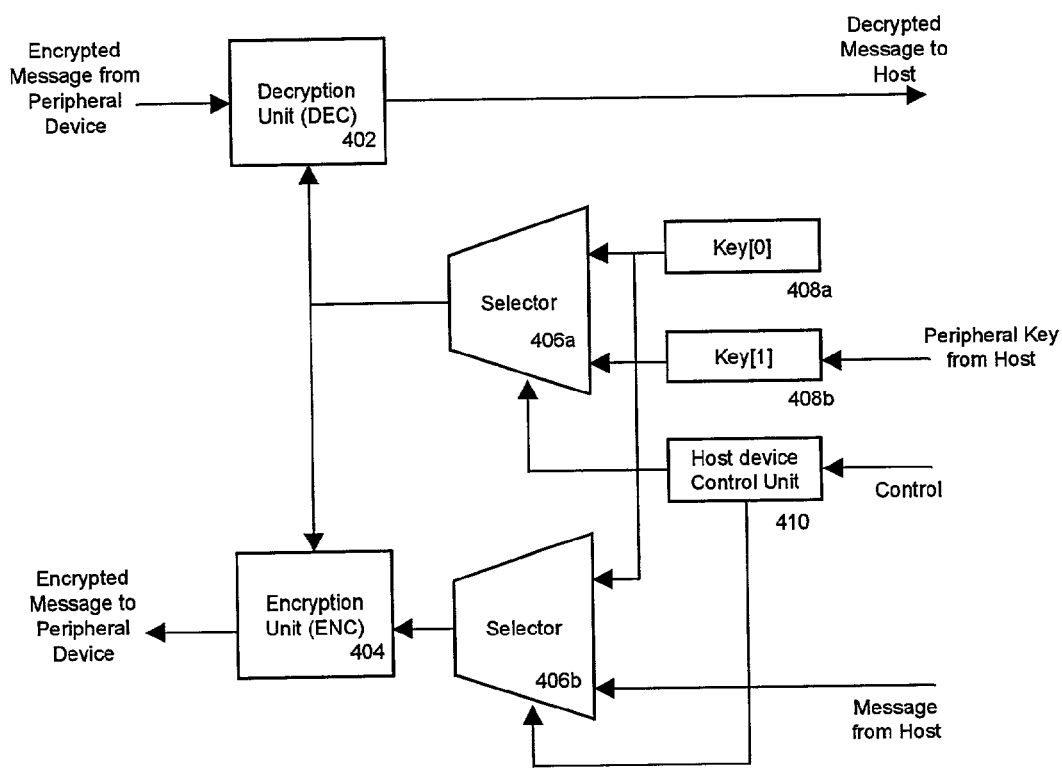

FIGS. 4A-4C are block diagrams of alternate embodiments of a key management and encryption unit 400, constructed and operative in accordance with an embodiment of the present invention. FIGS. 4A and 4C illustrate host embodiments of a key management and encryption unit, 400A and 400C. FIG. 4B depicts a peripheral embodiment of a key management and encryption unit 400B.

In FIG. 4A, the host key management and encryption unit 400A comprises a decryption unit (DEC) 402, an encryption unit (ENC) 404, at least two key storage units 408*a-b*, a key selector 406, and a host device control unit 410.

Encryption unit 404 encrypts messages to be transmitted through the wireless network 100 using a symmetric (i.e. "private") encryption key.

Received messages are decrypted by the decryption unit 402 using the same key as the encryption unit 404. Encryption unit 404 and decryption unit 402 may use any symmetric encryption-decryption method known in the art, and thus the embodiments vary according to the selected encryption algorithm.

The host device encryption key storage 408*a* stores the shared host secret key used for communication within the network. The shared host secret key may also be referred to as the "host device encryption key." In general, the shared host secret key may be globally unique. In alternate embodiments, it is sufficient that the shared host secret key be distinct from all encryption keys being used in other networks within operable range of network 100.

In some embodiments, host device encryption key storage 408*a* may be permanent memory such as a non-volatile memory, Read-Only Memory (ROM), Programmable Read-Only Memory (PROM), Erasable Programmable Read-Only Memory (EPROM), Electronically Erasable Programmable Read-Only Memory (EEPROM), or other persistent data storage medium as is known in the art.

In other embodiments, where the wireless host device 10 is never turned off, host device encryption key storage 408*a* may be stored in a volatile form of read-write memory.

Temporary key storage 408*b* may be any memory device as is known in the art, including but not limited to, Random Access Memory (RAM), Erasable Programmable Read-Only Memory (EPROM), Electronically Erasable Programmable Read-Only Memory (EEPROM), registers, and any form of modifiable (volatile or nonvolatile) memory, and temporary or persistent memory storage. For example, temporary key storage 408b may be a register built of D-Flip-flops or Erasable Programmable Read-Only Memory (EPROM).

The host device control unit 410 may be any form of intelligence that instructs selector 406 on selecting a key storage unit 408. In some embodiments host device control unit 410 may be a finite state machine. In yet other embodiments, host device control unit 410 may be a microprocessor executing instructions fetched from an instruction memory or other computer-readable medium.

Under the control of the host device control unit 410, the key used for encryption and decryption may be selected to be either a host device encryption key storage 408a or a temporary key provided by the host in temporary key storage 408b. Key selection is performed by selector 406. In some embodiments, selector 406 may be implemented as a multiplexer, although embodiments may use any selection implementation known in the art.

FIG. 4C depicts an alternate embodiment of the host key management and encryption unit 400C. In this embodiment, an additional selector 406b chooses between the host encryption key storage unit 408a and messages received from wireless host device 10, constructed and operative in accordance with an embodiment of the present invention.

In FIG. 4B, the peripheral key management and encryption unit 400B comprises a decryption unit (DEC) 402, an encryption unit (ENC) 404, a plurality of encryption key storage units 409a-n, a key selector 406, and a peripheral device control unit 411.

Under the control of the peripheral device control unit 411, the key used for encryption and decryption may be selected from the set of encryption key storage units 409a-n. The set of encryption key storage units includes a peripheral device encryption key storage unit 409a and one or more shared secret key storage units 409b-n. Secret keys may be received through the wireless network 100 from one or more wireless host devices 10. Key selection is performed by selector 406.

The implementation of encryption unit 404 and decryption unit 402 may be identical to that of the host key management and encryption unit 400A in that encryption unit 404 encrypts messages to be transmitted through the wireless network 100 using a symmetric (i.e. "private") encryption key. Decryption unit 402 uses the same key as the encryption unit 404 to decrypt the received messages. Encryption unit 404 and decryption unit 402 may use any symmetric encryption-decryption method known in the art, and thus the embodiments vary according to the selected encryption algorithm.

In some embodiments, selector 406 may be implemented as a multiplexer, although embodiments may use any selection implementation known in the art.

The peripheral device encryption key storage unit 409a stores the peripheral device encryption key used for shared host key distribution. In some embodiments, the peripheral device encryption key may be globally unique. A globally unique key precludes the possibility of two peripherals sharing the same secret key. In some alternate embodiments, it may be sufficient that the peripheral key be distinct from all encryption keys being used in other networks within operable range of network 100.

Peripheral control unit 411 may be any intelligence that aids selector 406 in the selection of one of the shared secret key storage units 409b-n.

The wireless peripheral device 20 interacts with the wireless network 100 through a peripheral embodiment of the wireless module 110. The wireless module 110 sends data received from the peripheral 25 to the wireless host device 10 and other wireless peripherals 20. Furthermore, wireless module 110 passes on data received from the wireless host 10 and other wireless peripherals 20a-n to the peripheral 25. In some embodiments, as described above, wireless module 110 may include an encryption engine, such as a key management and encryption unit 400 and a unique secret encryption key. The encryption key is used to encrypt and decrypt a host encryption key sent from the wireless host device 10 to the wireless module 110 or wireless peripheral device 20 during configuration. The wireless module 110 or wireless peripheral device 20 can store one or more host device encryption keys in its key memory 409b-n.

The wireless peripheral device 20 can communicate with any wireless host 10 whose encryption key it has stored in memory. The host device encryption key is securely transferred from the wireless host device 10 to the wireless peripheral 20 or wireless module 110 using any of the method embodiments described herein.

Figure 5:
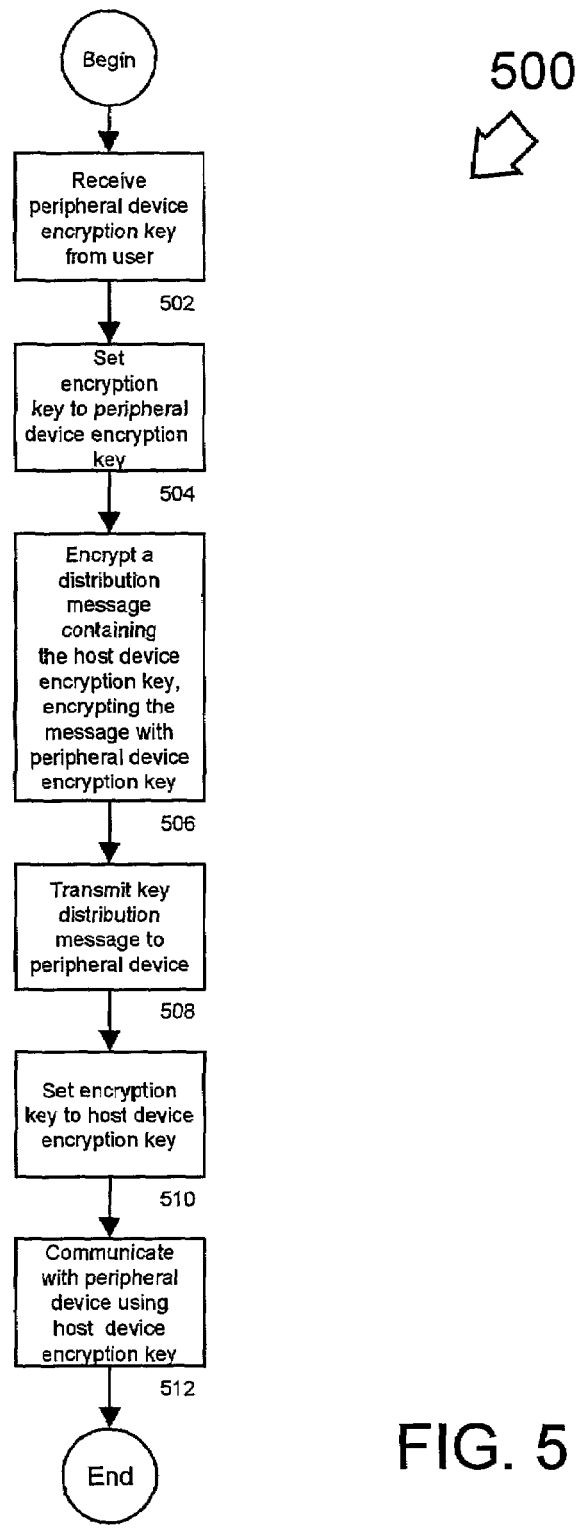
FIG. 5 is a flowchart of a host method 500, an embodiment to securely distribute a shared secret network encryption key from a host to a wireless peripheral device.

FIG. 5 is a flowchart of a host method 500, an embodiment to securely distribute a shared secret network encryption key from a host 10 to a wireless peripheral device 20 or wireless module 110, constructed and operative in accordance with an embodiment of the present invention.

Initially, at block 502, the wireless host device 10 receives the peripheral device encryption key, which is input by the user. In some embodiments, this may be accomplished through device configuration application software, as is known in the art.

As part of block 502, wireless module 110 or wireless host device 10 stores the peripheral device encryption key. In some embodiments, the key management and encryption unit 400 stores the peripheral key received from the host in temporary key storage 408b.

The peripheral device encryption key may be delivered with the wireless peripheral device 20, printed on a separate piece of paper, attached as a label to the device, or other means known in the art to associate an encryption key with a wireless peripheral device 20. In some embodiments, wireless module 110 receives the peripheral device encryption key from the host 15 or receives the key as input by the user.

The wireless module 110 sets its encryption key to the received peripheral device encryption key, block 504. In some embodiments, host device control unit 410 and selector 406 guide the selection of the peripheral device encryption key stored in temporary key storage 408b as part of block 504.

A key distribution message containing the shared host secret key, which may be stored in host device encryption key storage 408a, is encrypted by the encryption unit 404 using the peripheral device encryption key, block 506.

This key distribution message is then transmitted to the wireless peripheral device 20 which stores the received host secret key, block 508.

The encryption key of the host device is then reset to the shared host secret key, which may be stored in host device encryption key storage 408a, at block 510, and communication with the wireless peripheral device 20 using the shared host secret key can commence.

An embodiment of a host method, implemented in a host device control unit 410, is shown below in Table 1.

TABLE 1

Host Device Control Unit Pseudo-Code

```
valid = false;
currentKey = key[0];
while (true) {
    receiveFromHost(cmd, data, valid);
    if (valid) {
        if (cmd == SENDKEY) {                    // send host key to peripheral
            key[1] = data;                       // store peripheral key
            currentKey = key[1];                 // use peripheral's key
            sendToNetwork(SETKEY, key[0]);       // send host key (= key[0])
            currentKey = key[0];                 // use host key again
        } else if (cmd == DATA) {                // send data to peripheral
            sendToNetwork(DATA, data);
        }
    }
}
```

Figure 6:
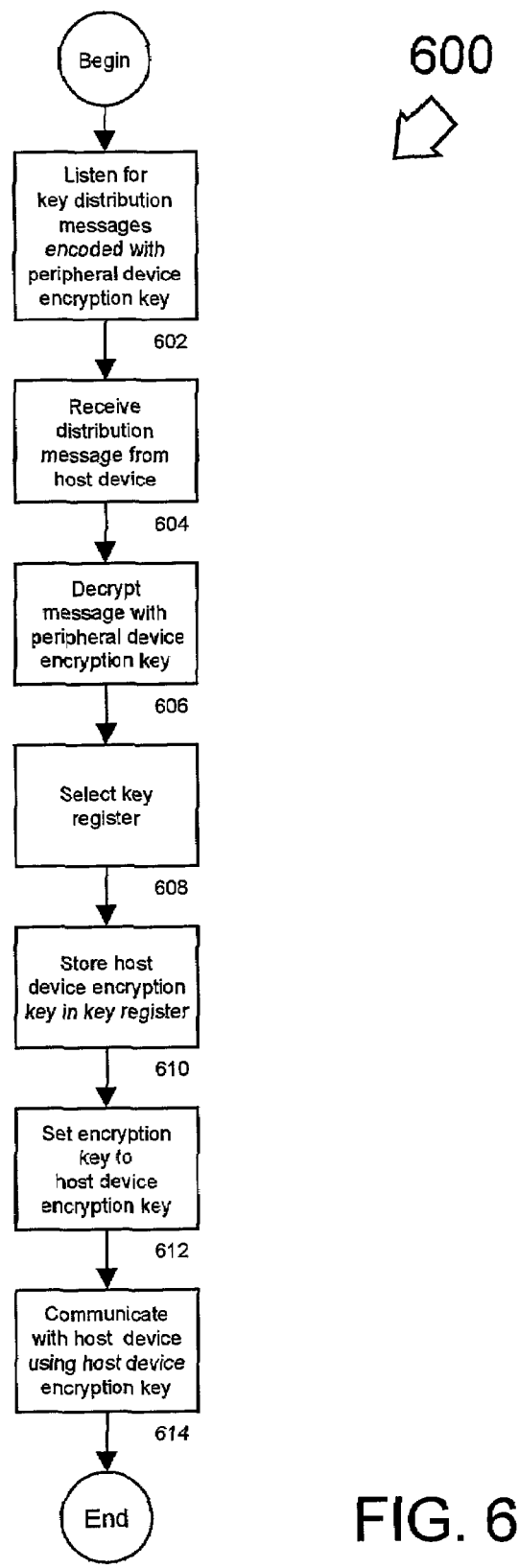
FIG. 6 depicts a flowchart of a peripheral method 600, a wireless peripheral device embodiment to securely receive a shared secret network encryption key from a host.

FIG. 6 depicts a flowchart of a peripheral method 600, an embodiment to securely receive a shared secret network encryption key from a host 10 to a wireless peripheral device 20 or wireless module 110, constructed and operative in accordance with an embodiment of the present invention.

When the wireless peripheral device 20 is turned on, or otherwise activated, the wireless peripheral device 20 listens for key distribution messages encoded with its own peripheral device encryption key, block 602. As discussed above, in some embodiments the peripheral device encryption key may be stored in a peripheral device encryption key storage unit 409a. The wireless peripheral device 20 selects the peripheral device encryption key as the encryption (and decryption) key and listens for key distribution messages.

When the wireless peripheral device 20 receives a key distribution message from a host 10, at block 604, decryption unit 402 decrypts the message and retrieves the shared host secret key, block 606.

An unused peripheral device encryption key storage unit 409b-n is selected, block 608, and the decoded shared host secret key (also referred to as the host device encryption key) is stored within the peripheral device encryption key storage unit 409n, block 610.

Thereafter, whenever the peripheral wishes to communicate with a specific host device 10, it sets the encryption key to the corresponding shared host secret key stored within the peripheral device encryption key storage 409n, block 612, and communicates with the host device 10, block 614.

Figure 7:
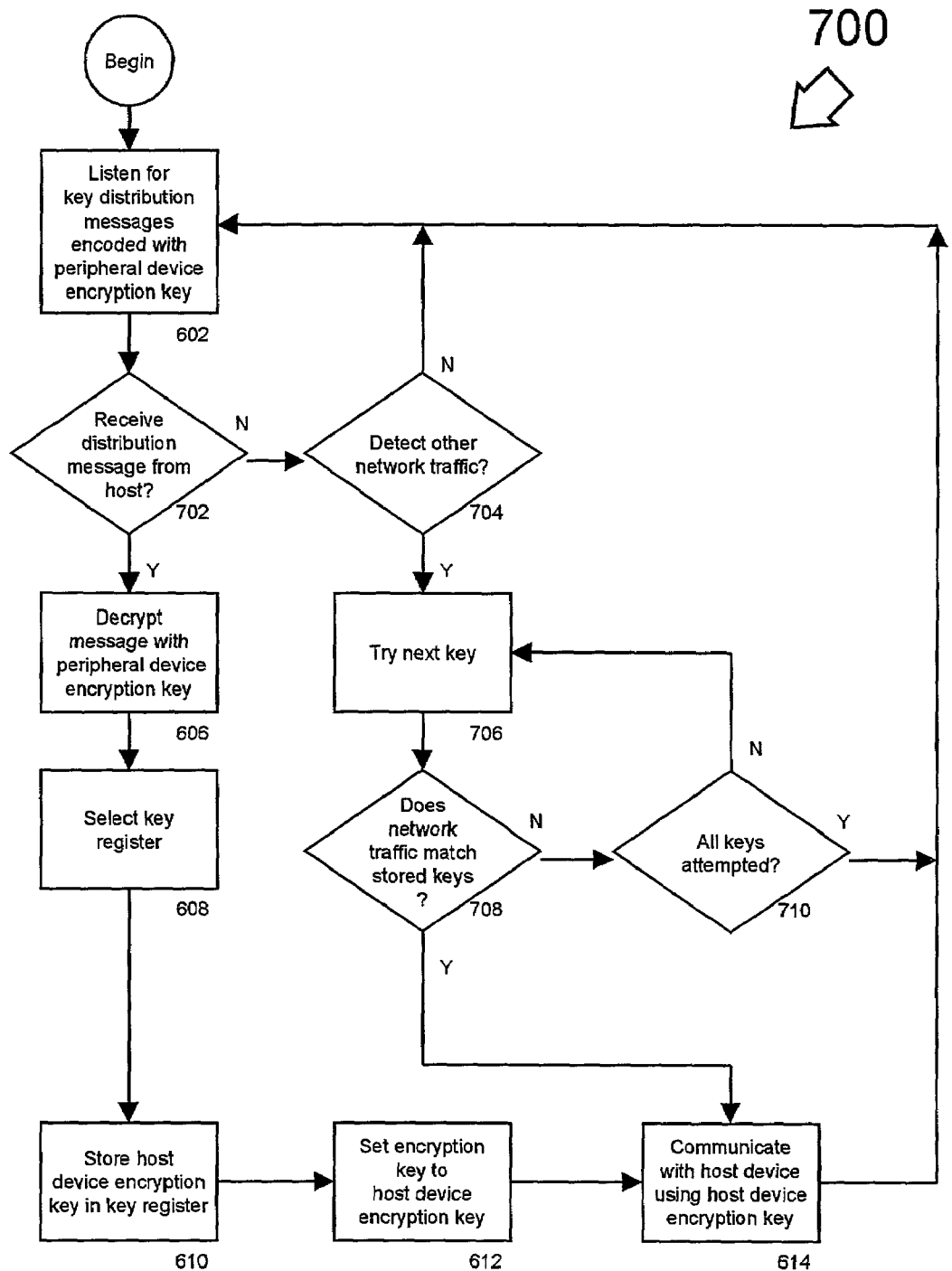
FIG. 7 illustrates a flowchart of a peripheral method 700, an alternate embodiment to securely receive a shared secret network encryption key from a host to a wireless peripheral device.

FIG. 7 illustrates a flowchart of a peripheral method 700, an alternate embodiment to securely receive a shared secret network encryption key from a wireless host device 10, constructed and operative in accordance with an embodiment of the present invention.

When the wireless peripheral device 20 is activated, the wireless peripheral device 20 listens for key distribution messages encoded with its own peripheral device encryption key, block 602. In some embodiments the peripheral device encryption key may be stored in a peripheral device encryption key storage 409a. The wireless peripheral device 20 selects the peripheral device encryption key as the encryption (and decryption) key and listens for key distribution messages. Process 700 proceeds to decision block 702.

At decision block 702, peripheral control unit 411 determines whether a key distribution message has been sent from the wireless host device 10.

When the wireless peripheral device 20 receives a key distribution message, as determined by decision block 702, decryption unit 402 decrypts the message and retrieves the shared host secret key, block 606. An unused peripheral device encryption key storage unit 409b-n is selected, block 608, and the decoded shared host secret key (also known as the host device encryption key) is stored within the peripheral device encryption key storage 409n, block 610. Thereafter, whenever the peripheral wishes to communicate to a specific host device 10, it sets the encryption key to the corresponding shared host secret key stored within the peripheral device encryption key storage 409n, block 612, and communicates with the host device 10, block 614. Process 700 then returns to block 602.

If a distribution message has been sent from the wireless host device 10, as determined by decision block 702, process 700 continues to decision block 704.

At decision block 704, process 700 determines whether other network traffic is detected. If no traffic is detected, process 700 returns to block 602. If other network traffic is detected, process 700 continues at block 706, and peripheral control unit 411 attempts to decode the message using another encryption key stored in one of the peripheral device encryption key storage units 409b-n. If the network traffic matches a stored key, as determined by decision block 708, communication with a host device is continued with the stored host device encryption key. Otherwise, if the network traffic does not match, process 700 tries the next key, block 706, until all stored keys are attempted, block 710, and then process 700 returns to block 602.

Figure 8:
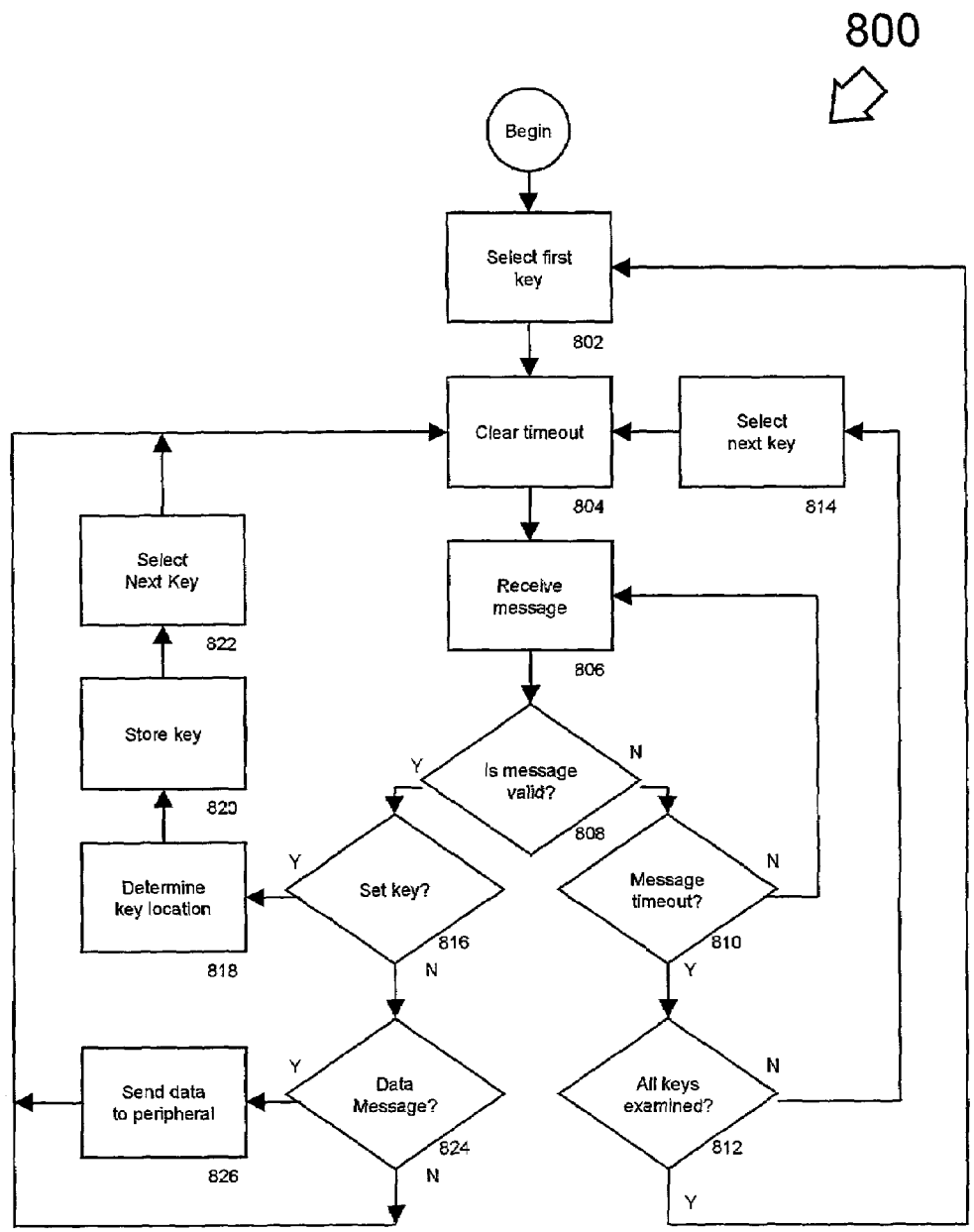
FIG. 8 is a flowchart of a peripheral method 800, an alternate embodiment to securely receive a shared secret network encryption key from a host to a wireless peripheral device.

FIG. 8 is a flowchart of a peripheral process 800, an alternate embodiment to securely receive a shared secret network encryption key from a wireless host device 10 to a wireless peripheral device 20 or wireless module 110, constructed and operative in accordance with an embodiment of the present invention. Process 800 allows a wireless peripheral device 20 or wireless module 110 to change the selected encryption key, when associating with one wireless network 100 to another.

Initially at block 802, the wireless peripheral device 20 selects the peripheral device encryption key stored in peripheral device encryption key storage 409a.

Any key timeout situation is cleared at block 804.

Wireless module 110 or wireless peripheral device 20 listens and receives a message over the wireless network at block 806.

At block 808, process 800 determines whether the received message is valid. A valid message is one that has been received without transmission error, and that can be successfully decrypted by wireless module 110. In some embodiments of the invention, validity is determined on whether decryption unit 402 is able to decrypt the received message with the selected encryption key. If the received message is valid, as determined by decision block 808, flow continues at block 816. Otherwise, if the received message is invalid, process flow continues at block 810.

At block 810, process 800 determines whether there has been a message timeout. If no message has been successfully received after a predetermined amount of time, a timeout occurs. If there is no timeout, flow returns to block 806. If there is a message timeout, as determined by block 810, decision block 812 checks to see if all stored encryption keys have been examined. If all the encryption keys are examined, the process begins anew and flow returns to block 802. If all the encryption keys have not been examined, the next available key is selected at block 814, and flow continues at block 804.

At block 816, process 800 checks to see if the valid message is a key distribution message. If the message is a set encryption key message, as determined by decision block 816, flow continues at block 818. Otherwise, flow continues at decision block 824.

At block 818, the peripheral control unit 411 selects a peripheral key storage unit 409 and stores the received encryption key in the selected storage unit 409. In selecting a storage unit 409, the peripheral control unit 411 first determines whether there are peripheral key storage units 409b-n that are not in use. An unused storage unit 409 is then selected.

In some embodiments, if all of the peripheral key storage units 409b-n are already in use, the peripheral chooses the last peripheral key storage units 409n. Other key replacement strategies as are known in the art, can be equally applied.

The received encryption key is then stored in the peripheral key storage unit 409, block 820. The next available key is selected, and process flow returns to block 804.

If the message is not a set encryption key message, as determined by decision block 816, decision block 824 determines whether the message is a data message. If the message received is a data message, the message is forwarded to the peripheral device 25 connected to the wireless module 110 at block 826. Otherwise, flow returns to block 804.

An embodiment of a peripheral method, implemented in a peripheral device control unit 411, is shown below in Table 2.

TABLE 2

Pseudo-Code for Peripheral Device Control Unit

```
MAXKEYS = N;         // N >= 2
nofKeys = 1;
keyIndex = 0;
currentKey = key[keyIndex];
valid = timeout = false;
while (true) {
    receiveFromNetwork(cmd, data, valid, timeout);
    if (valid) {           // received a packet
        if (cmd == SETKEY) {                    // add new network key
            if (nofKeys < MAXKEYS) {            // not full, append
                keyIndex = nofKeys;
                nofKeys = nofKeys + 1;
            } else    // full, replace last key
                keyIndex = nofKeys - 1;
            key[keyIndex] = data;               // store new key (= data)
            currentKey = key[keyIndex];
        } else if (cmd == DATA) {               // received data packet
            sendToPeripheral(DATA, data);       // pass data on
        }
```

TABLE 2-continued

Pseudo-Code for Peripheral Device Control Unit

```
    } else if (timeout) {                       // no response in a while
        if (keyIndex < nofKeys - 1)             // try next used key
            keyIndex = keyIndex + 1;
        else              // wrap around to first key
            keyIndex = 0;
        currentKey = key[keyIndex];
    }
}
```

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An apparatus comprising:
   a first encryption key storage unit configured to store a first encryption key;
   a second encryption key storage unit configured to contain a second encryption key;
   an encryption unit configured to encrypt a message containing the first encryption key, the message encrypted with the second encryption key;
   a radio configured to transmit the message over a wireless network and configured to receive a subsequent message over the wireless network, the subsequent message encrypted with the first encryption key;
   a decryption unit configured to decrypt the subsequent message received from the radio, with the first encryption key;
   a protocol management unit configured to convey the subsequent message to a host device, wherein the apparatus further comprises:
   a selector configured to select between the encryption key storage units as input to the encryption unit and decryption unit.

2. The apparatus of claim 1, further comprising:
   a device control unit configured to aid the selector in the selection between the encryption key storage units.

3. The apparatus of claim 2 wherein the second encryption key is symmetric.

4. The apparatus of claim 3 wherein the first encryption key is symmetric.

5. The apparatus of claim 1 wherein the second encryption key is a peripheral device encryption key.

6. The apparatus of claim 5 wherein the first encryption key is a host device encryption key.

7. The apparatus of claim 6 wherein the peripheral device encryption key is received by the host device via input by a user.

8. The apparatus of claim 7 wherein the protocol management unit is configured to convey the subsequent message to the host device via the Universal Serial Bus protocol.

9. The apparatus of claim 1 wherein the first encryption key is specific to the host device coupled to the radio.

10. A method comprising:
    receiving, at a module, a second encryption key;

storing the second encryption key in a second encryption key storage unit;

selecting the second encryption key from the second encryption key storage unit as an encryption key;

transmitting, from the module, a message containing a first encryption key over a wireless network, the message encrypted with the second encryption key;

selecting the first encryption key from the a first encryption key storage unit as a decryption key;

receiving, at the module, a subsequent message encrypted with the first encryption key;

decrypting the subsequent message with the first encryption key; and conveying the subsequent message to a host device.

11. The method of claim 10 wherein the second encryption key is symmetric.

12. The method of claim 10 wherein the first encryption key is symmetric.

13. The method of claim 10 wherein the second encryption key is a peripheral device encryption key.

14. The method of claim 13 wherein the first encryption key is a host device encryption key.

15. The method of claim 14 wherein the peripheral device encryption key is received by the host device via input by a user.

16. The method of claim 14 wherein the first encryption key storage unit that stores the host device encryption key is a read only memory.

17. The method of claim 16 further comprising:
sending the decoded subsequent message to the host device using a Universal Serial Bus interface.

18. The method of claim 10 wherein the first encryption key is specific to the host device coupled to the module.

19. A computer-readable medium encoded with data and instructions, the data and instructions causing an apparatus executing the instruction to:
receive, at a module, a second encryption key;
store the second encryption key in a second encryption key storage unit;
select the second encryption key from the second encryption key storage unit as an encryption key;
transmit, from the module, a message containing a first encryption key over a wireless network, the message encrypted with the second encryption key;
select the first encryption key from the a first encryption key storage unit as a decryption key;
receive, at the module, a subsequent message encrypted with the first encryption key;
decrypt the subsequent message with the first encryption key; and convey the subsequent message to a host device.

20. The computer-readable medium of claim 19 wherein the second encryption key is symmetric.

21. The computer-readable medium of claim 20 wherein the first encryption key is symmetric.

22. The computer-readable medium of claim 19 wherein the second encryption key is a peripheral device encryption key.

23. The computer-readable medium of claim 22 wherein the first encryption key is a host device encryption key.

24. The computer-readable medium of claim 23 wherein the peripheral device encryption key is received by the host device via input by a user.

25. The computer-readable medium of claim 23 wherein the encryption key storage unit that stores the host device encryption key is a read only memory.

26. The computer-readable medium of claim 25, the instructions further causing an apparatus executing the instructions to:
sending the decoded subsequent message to the host device using a Universal Serial Bus interface.

27. The computer-readable medium of claim 19 wherein the first encryption key is specific to the host device coupled to the module.

28. An apparatus comprising:
means for receiving, at a module, a second encryption key;
means for storing the second encryption key in a second encryption key storage unit;
means for selecting the second encryption key from the second encryption key storage unit as an encryption key;
means for transmitting, from the module, a message containing a first encryption key over a wireless network, the message encrypted with the second encryption key;
means for selecting the first encryption key from the a first encryption key storage unit as a decryption key;
means for receiving, at the module, a subsequent message encrypted with the first encryption key;
means for decrypting the subsequent message with the first encryption key; and
means for conveying the subsequent message to a host device.

29. The apparatus of claim 28 wherein the second encryption key is symmetric.

30. The apparatus of claim 29 wherein the first encryption key is symmetric.

31. The apparatus of claim 28 wherein the second encryption key is a peripheral device encryption key.

32. The apparatus of claim 31 wherein the first encryption key is a host device encryption key.

33. The apparatus of claim 32 wherein the peripheral device encryption key is received by the host device via input by a user.

34. The apparatus of claim 33 further comprising:
means for decrypting received messages.

35. The apparatus of claim 34 further comprising:
means for encrypting messages to be transmitted.

36. The apparatus of claim 35 further comprising:
means for sending the decoded subsequent message to the host device using a Universal Serial Bus interface.

37. The apparatus of claim 28 wherein the first encryption key is specific to the host device coupled to the module.

38. An apparatus comprising:
a first encryption key storage unit configured to contain a first encryption key;
a radio configured to receive a message over a wireless network from a host and to transmit a subsequent message over the wireless network, the received message encoded with the first encryption key and containing a second encryption key, the subsequent message encrypted with the second encryption key;
a decryption unit configured to decrypt the received message with the first encryption key;
at least one temporary key storage unit configured to store the second encryption key;
an encryption unit configured to encrypt the subsequent message with the second encryption key; and
wherein the radio is further configured to receive data messages over the wireless network from the host, the data message encoded with the second encryption key; and wherein the apparatus further comprises:
a selector configured to select between the encryption key storage units as input to the encryption unit and decryption unit.

39. The apparatus of claim 38, further comprising:
a device control unit configured to aid the selector in the selection between the encryption key storage units.

40. The apparatus of claim 39, further comprising:
a protocol management unit configured to convey the data message to a peripheral device.

41. The apparatus of claim 40, wherein the protocol management unit is configured to convey the data message to a peripheral device via the Universal Serial Bus protocol.

42. The apparatus of claim 41 wherein the first encryption key is symmetric.

43. The apparatus of claim 42 wherein the second encryption key is symmetric.

44. The apparatus of claim 38 wherein the first encryption key is a peripheral device encryption key.

45. The apparatus of claim 44 wherein the second encryption key is a host device encryption key.

46. The apparatus of claim 38 wherein the second encryption key is specific to the host.

47. A method comprising:
receiving a message over a wireless network from a host, the message encoded with a first encryption key and containing a second encryption key;
decrypting the received message using the first encryption key selected as a decryption key from a first encryption key storage unit storing a first encryption key, extracting the second encryption key;
storing the second encryption key in a second encryption key storage unit;
selecting the second encryption key from the second encryption key storage unit as an encryption key;
encrypting the subsequent messages with the second encryption key; and
sending the encrypted subsequent messages to the host over the wireless network.

48. The method of claim 47 wherein the first encryption key is symmetric.

49. The method of claim 48 wherein the second encryption key is symmetric.

50. The method of claim 47 wherein the first encryption key is a peripheral device encryption key.

51. The method of claim 50 wherein the second encryption key is a host device encryption key.

52. The method of claim 51 wherein the second encryption key storage unit is a register.

53. The method of claim 52 wherein the encrypted messages sent to the host are received through a Universal Serial Bus interface.

54. The method of claim 47 wherein the second encryption key is specific to the host.

55. A computer-readable medium encoded with data and instructions, the data and instructions causing an apparatus executing the instructions to:
receive a message over a wireless network from a host, the message encoded with a first encryption key and containing a second encryption key;
decrypt the received message using the first encryption key selected as a decryption input from a first encryption key storage unit storing the first encryption key, extracting the second encryption key;
store the second encryption key in a second encryption key storage unit;
select the second encryption key from the second encryption key storage unit as an encryption input;
encrypt subsequent messages with the second encryption key; and
send the encrypted subsequent messages to the host over the wireless network.

56. The computer-readable medium of claim 55 wherein the first encryption key is symmetric.

57. The computer-readable medium of claim 56 wherein the second encryption key is symmetric.

58. The computer-readable medium of claim 55 wherein the first encryption key is a peripheral device encryption key.

59. The computer-readable medium of claim 58 wherein the second encryption key is a host device encryption key.

60. The computer-readable medium of claim 59 wherein the encryption key storage unit is a register.

61. The computer-readable medium of claim 59 wherein the encrypted messages sent to the host were received through a Universal Serial Bus interface.

62. The computer-readable medium of claim 55 wherein the second encryption key is specific to the host.

63. An apparatus comprising:
means for receiving a message over a wireless network from a host, the message encoded with a first encryption key and containing a second encryption key;
means for decrypting the received message using the first encryption key selected as a decryption input from a first encryption key storage unit storing the first encryption key, extracting the second encryption key;
means for storing the second encryption key in a second encryption key storage unit;
means for selecting the second encryption key from the second encryption key storage unit as an encryption input;
means for encrypting subsequent messages with the second encryption key; and
means for sending the encrypted subsequent messages to the host over the wireless network.

64. The apparatus of claim 63 further comprising:
means for storing the first encryption key.

65. The apparatus of claim 64 wherein the first encryption key is symmetric.

66. The apparatus of claim 65 wherein the second encryption key is symmetric.

67. The apparatus of claim 63 wherein the first encryption key is a peripheral device encryption key.

68. The apparatus of claim 67 wherein the second encryption key is a host device encryption key.

69. The apparatus of claim 68 wherein the means for storing the second encryption key is a register.

70. The apparatus of claim 69 wherein the encrypted messages sent to the host were received through a Universal Serial Bus interface.

71. The apparatus of claim 63 wherein the second encryption key is specific to the host.

* * * * *

UNITED STATES PATENT AND TRADEMARK OFFICE
CERTIFICATE OF CORRECTION

PATENT NO. : 7,310,424 B2 Page 1 of 1
APPLICATION NO. : 10/032228
DATED : December 18, 2007
INVENTOR(S) : Gehring et al.

It is certified that error appears in the above-identified patent and that said Letters Patent is hereby corrected as shown below:

In Claim 8, at Column 10, Line 61 (approximately) after "Claim 7" insert --,--.

In Claim 10, at Column 11, Line 8 before "a" delete "the".

In Claim 19, at Column 11, Line 46 (approximately) before "a" delete "the".

In Claim 28, at Column 12, Line 21 (approximately) before "a" delete "the".

Signed and Sealed this

Sixth Day of May, 2008

JON W. DUDAS
*Director of the United States Patent and Trademark Office*